US009252665B2

(12) United States Patent
Hashino et al.

(10) Patent No.: US 9,252,665 B2
(45) Date of Patent: Feb. 2, 2016

(54) DC-DC CONVERTER CONTROL APPARATUS

(75) Inventors: Satoshi Hashino, Wako (JP); Keigo Andoh, Wako (JP); Mitsuaki Hirakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 13/700,086

(22) PCT Filed: May 12, 2011

(86) PCT No.: PCT/JP2011/060920
§ 371 (c)(1),
(2), (4) Date: Nov. 26, 2012

(87) PCT Pub. No.: WO2011/152181
PCT Pub. Date: Dec. 8, 2011

(65) Prior Publication Data
US 2013/0069610 A1    Mar. 21, 2013

(30) Foreign Application Priority Data
Jun. 1, 2010   (JP) .................................. 2010-126172

(51) Int. Cl.
*H02M 1/00* (2007.01)
*H02M 3/158* (2006.01)
*H02M 1/40* (2007.01)

(52) U.S. Cl.
CPC .............. *H02M 3/1584* (2013.01); *H02M 1/40* (2013.01); *H02M 2001/0009* (2013.01)

(58) Field of Classification Search
CPC ............ H02M 3/1584; H02M 3/1588; H02M 2003/1552; H02M 2001/0009; H02M 2001/0064; H02M 2001/0048; H02M 1/40; H02M 3/335; H02M 3/33507; H02M 3/33515; H02M 3/3353; H02M 3/33561; H02M 3/337; H02M 3/3376; H02M 7/02; H02M 7/04; H02M 7/12; H02M 7/125; H02M 7/5375; H02M 7/538; H02M 7/53803; H02M 7/53871
See application file for complete search history.

(56) References Cited

U.S. PATENT DOCUMENTS 6,362,986 B1    3/2002  Schultz et al.
7,233,132 B1 *  6/2007  Dong .................. H02M 3/1584
                                                  323/272

(Continued)

FOREIGN PATENT DOCUMENTS

JP    09-182415 A    7/1997
JP    9-182415 A     7/1997

(Continued)

OTHER PUBLICATIONS

European Search Report and Supplementary European Search Report dated Jun. 16, 2014, issued in corresponding EP Application No. EP11789590, 4 pages.

(Continued)

*Primary Examiner* — Nguyen Tran
*Assistant Examiner* — Shahzeb K Ahmad
(74) *Attorney, Agent, or Firm* — Squire Patton Boggs (US) LLP

(57) ABSTRACT

In a DC-DC converter control apparatus, it is configured to have a current sensor for detecting a current flowing through a positive electrode wire connecting the second common terminal with the positive electrode terminal of the high-voltage port and to control operations of the first and second switching elements based on the current detected by the current sensor. With this, it becomes possible to accurately detect the current of the windings and appropriately control the operation of the switching elements based on the detected currents without increasing the transformer in size.

14 Claims, 9 Drawing Sheets

(56) References Cited

U.S. PATENT DOCUMENTS

| | | | |
|---|---|---|---|
| 8,188,720 B2* | 5/2012 | Kim | H02M 3/158 323/222 |
| 2005/0174097 A1* | 8/2005 | Kimura et al. | 323/282 |
| 2008/0019158 A1 | 1/2008 | Wu et al. | |
| 2008/0036435 A1* | 2/2008 | Watanabe et al. | 323/271 |
| 2010/0019702 A1 | 1/2010 | Jang et al. | |
| 2010/0123441 A1 | 5/2010 | Kim et al. | |

FOREIGN PATENT DOCUMENTS

| | | |
|---|---|---|
| JP | 2006271102 A | 10/2006 |
| JP | 2008-43104 A | 2/2008 |
| JP | 2008-043104 A | 2/2008 |
| JP | 2009-033921 A | 2/2009 |
| JP | 2009-33921 A | 2/2009 |
| JP | 2010-64744 A | 3/2010 |
| JP | 2010-064744 A | 3/2010 |
| JP | 2010-119175 A | 5/2010 |

OTHER PUBLICATIONS

Mathieu Le Bolloch et al., "Current-sharing control technique for interleaving VRMs using intercell transformers", 13TH European Conference on Power Electronics and Applications, EPE '09, Sep. 8-10, 2009, Barcelona, Spain, IEEE, Piscataway, NJ, USA, Sep. 8, 2009, pp. 1-10, XP031541367, ISBN: 978-1-4244-4432-8.

Feng Zheng et al., "Design Coupled Inductors for Interleaved Converters Using a Three-Leg Core", IEEE Transactions on Magnetics, vol. 44, No. 12, Dec. 2008, pp. 4697-4705.

Japanese Office Action, Notification of Grounds for Rejection, application No. JP2012-518305 dated May 21, 2014.

\* cited by examiner

DC-DC CONVERTER CONTROL APPARATUS

CROSS-REFERENCED TO RELATED APPLICATION

This application is a National Phase entry of International Application PCT/JP2011/060920, filed May 12, 2011, which claims priority to Japanese Patent Application No. 2010-126172, filed Jun. 1, 2010, the disclosure of the prior applications are hereby incorporated in their entirety by reference.

TECHNICAL FIELD

This invention relates to a DC-DC converter control apparatus.

BACKGROUND ART

In recent years, there is proposed a DC-DC converter having a magnetic-field canceling type transformer equipped with first and second windings that are wound around a core in reverse directions, and first and second switching elements connected to the windings (for example, see a patent reference 1). In the patent reference 1, currents flowing through the first and second windings are detected by a plurality of (two) current sensors to calculate a current difference therebetween, while the operation of the first and second switching elements are controlled so that the calculated current difference becomes zero.

PRIOR ART REFERENCE

Patent Reference

Patent Reference 1: Japanese Laid-Open Patent Application 2008-43104

SUMMARY OF INVENTION

Problems to be Solved by the Invention

Such current sensors have individual variability due to mass production dispersion, etc., so that offsets exist in their outputs and the amounts of offsets are not the same. Consequently, when the current difference is calculated based on the outputs of a plurality of the current sensors as stated in the patent reference 1, since amounts of the offsets of the sensors are different from each other, it causes an error between the calculation result and the actual current difference accordingly and therefore, the operations of the first and second switching elements may not be appropriately controlled.

In addition, in the case where the error exists, even when the operations of the switching elements are controlled so that the current difference becomes zero, a magnetic flux resulting from the error (i.e., current) resides in the transformer. Accordingly, in order to avoid magnetic saturation of the transformer to be caused by the residual magnetic flux, the transformer needs to be increased in size, disadvantageously.

The object of this invention is therefore to overcome the problems by providing an apparatus for controlling a DC-DC converter having a magnetic-field canceling type transformer equipped with first and second windings and first and second switching elements connected to the windings, which apparatus can appropriately control the operations of the switching elements by accurately detecting currents of the windings without increasing the transformer in size.

Means for Solving the Problems

In order to achieve the object, as recited in claim 1, this invention is configured to have an apparatus for controlling a DC-DC converter having a magnetic-field canceling type transformer including first and second windings wound in reverse directions, each of the windings being connected to a positive electrode terminal of a low-voltage port at one end and connected to a positive electrode terminal of a high-voltage port through a common terminal at other end; a first switching element interposed between the other end of the first winding and a negative electrode wire connecting a negative electrode terminal of the low-voltage port with a negative electrode terminal of the high-voltage port; and a second switching element interposed between the other end of the second winding and the negative electrode wire, characterized by: current detecting means for detecting a current flowing through a positive electrode wire connecting the common terminal with the positive electrode terminal of the high-voltage port; and control means for controlling operations of the first and second switching elements based on the current detected by the current detecting means.

As mentioned in the DC-DC converter control apparatus recited in claim 2, the current detecting means comprises a current sensor capable of detecting a direct current component of the current flowing through the positive electrode wire.

As mentioned in the DC-DC converter control apparatus recited in claim 3, the control means calculates a current difference of the first and second windings based on the detected current and controls the operations of the first and second switching elements based on the calculated current difference.

As mentioned in the DC-DC converter control apparatus recited in claim 4, the control means calculates the current difference of the first and second windings based on the detected current and controls the operations of the first and second switching elements such that the calculated current difference becomes zero.

As mentioned in the DC-DC converter control apparatus recited in claim 5, the DC-DC converter is mounted on a fuel cell vehicle.

As mentioned in the DC-DC converter control apparatus recited in claim 6, the DC-DC converter is mounted on a hybrid vehicle.

As mentioned in the DC-DC converter control apparatus recited in claim 7, the DC-DC converter is mounted on an electric vehicle.

Effects of the Invention

In the DC-DC converter control apparatus recited in claim 1, since it is configured to have the current detecting means for detecting a current flowing through a positive electrode wire connecting the common terminal with the positive electrode terminal of the high-voltage port and control means for controlling operations of the first and second switching elements based on the current detected by the current detecting means, it becomes possible to accurately detect the current of the windings and appropriately control the operation of the switching elements based on the detected currents without increasing the transformer in size.

To be more specific, since there exists a period in which the same current as that flows through the first or second winding in accordance with the ON/OFF states of the switching elements flows through the positive electrode wire, the currents of the first and second windings can be accurately determined by detecting the current flowing through the positive electrode wire using the current detecting means at the appropriate timing. Further, since, without using a plurality of current detecting means the single current detecting means is provided at the positive electrode wire to detect the currents of the windings, the structure can be made simple. Also, even when the current difference of the first and second windings is calculated, since an error to be caused by difference in the offset amounts does not occur between the calculated current difference and actual current difference, i.e., a magnetic flux resulting from the error does not reside in the transformer, it is not necessary to increase the transformer in size, while it is advantageous in cost.

In the DC-DC converter control apparatus recited in claim 2, it is configured such that the current detecting means comprises a current sensor capable of detecting a direct current (DC) component of the current flowing through the positive electrode wire. Since the sum of detected two current values (current values of the first and second windings) becomes equal to an inputted current value of the DC-DC converter, the current detecting means can be used for current feedback control and/or over-current detection of inputted current. With this, a current sensor for detecting only the inputted current can be removed. With this, it becomes possible to make the circuit structure simple and suppress the cost.

Similarly, when the current detecting means comprises the current sensor capable of detecting the direct current (DC) component of the current also, since an average of the two detected current values becomes equal to an outputted current value of the DC-DC converter, the current sensor can be used for current feedback control and/or over-current detection of outputted current. With this, it becomes possible to detect the inputted and outputted current of the DC-DC converter by this single current detecting means (current sensor). On the contrary, if a current sensor that can only detect an alternating current (AC) component of the current is employed as the current detecting means, it would merely work to maintain a current balance.

In the DC-DC converter control apparatus recited in claim 3, since it is configured such that the current difference of the first and second windings is calculated based on the detected currents and the operations of the first and second switching elements are controlled based on the calculated current difference. With this, in addition to the effects mentioned above, it becomes possible to control the operations of the first and second switching elements such that the calculated current difference becomes zero, for example, thereby enabling to surely decrease the magnetic flux density at the core of the transformer that could vary in accordance with the current difference, while decreasing the core in size.

In the DC-DC converter control apparatus recited in claim 4, since it is configured such that the current difference of the first and second windings is calculated based on the detected currents and the operations of the first and second switching elements are controlled such that the calculated current difference becomes zero. With this, in addition to the effects mentioned in claim 3, it becomes possible to more surely decrease the magnetic flux density at the core of the transformer that could vary in accordance with the current difference, while further decreasing the core in size.

In the DC-DC converter control apparatus recited in claim 5, since it is configured such that the DC-DC converter is mounted on a fuel-cell vehicle, the foregoing effects can be achieved in the fuel cell vehicle.

In the DC-DC converter control apparatus recited in claim 6, since it is configured such that the DC-DC converter is mounted on a hybrid vehicle, the same effects as mentioned in claims 1 and 2 can be achieved in the hybrid vehicle.

In the DC-DC converter control apparatus recited in claim 7, since it is configured such that the DC-DC converter is mounted on an electric vehicle, the same effects as mentioned in claims 1 and 2 can be achieved in the electric vehicle.

DESCRIPTION OF EMBODIMENTS

Embodiments for carrying out a DC-DC converter control apparatus according to the present invention will now be explained with reference to the attached drawings.

First Embodiment

Figure 1:
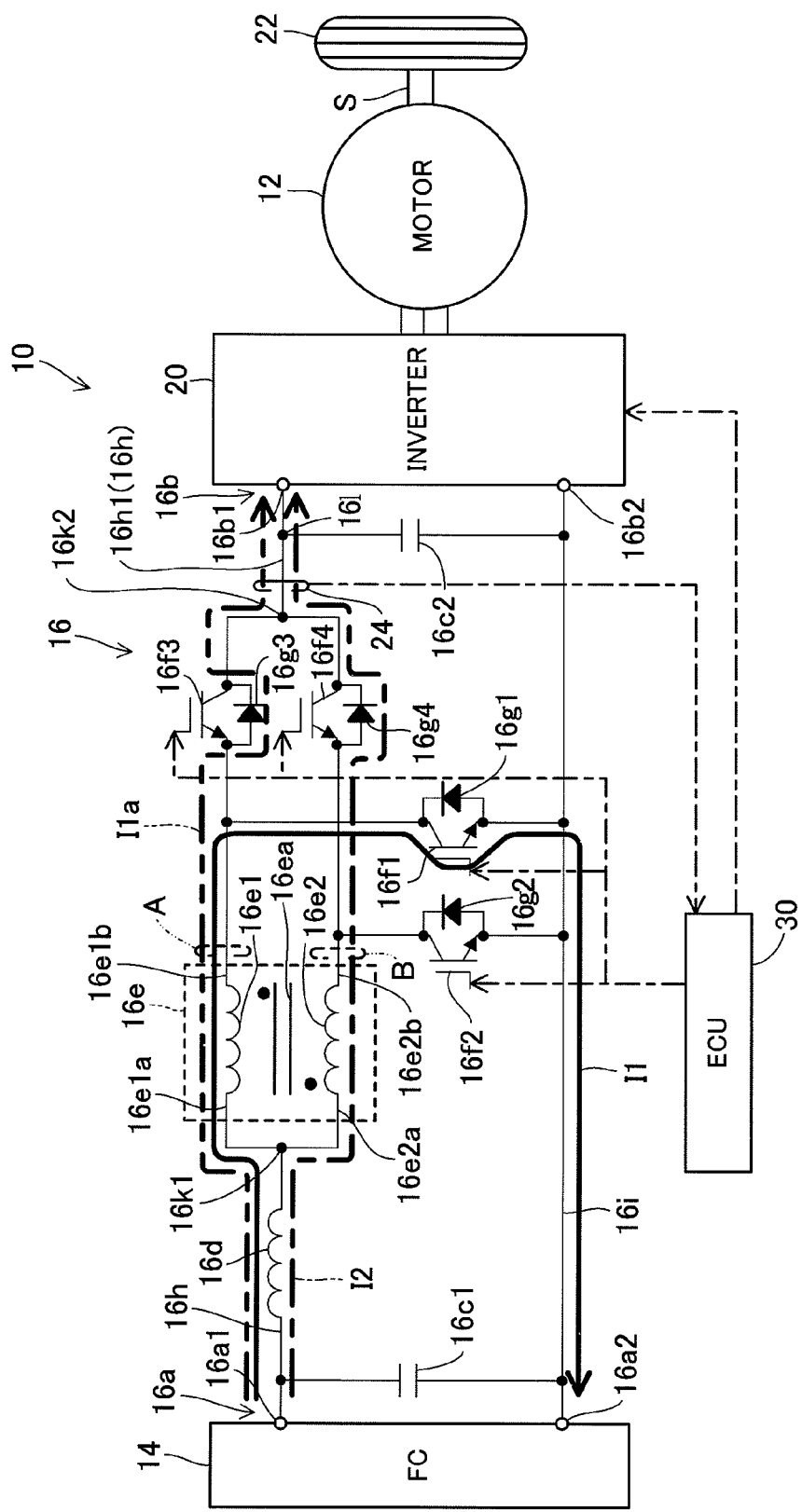
FIG. 1 is an overall schematic view of a DC-DC converter control apparatus according to a first embodiment of this invention.

FIG. 1 is an overall schematic view of a DC-DC converter control apparatus according to a first embodiment of this invention.

In FIG. 1, reference numeral 10 indicates a vehicle. The vehicle 10 comprises a fuel cell vehicle that is mounted with an electric rotating machine 12 (indicated as "MOTOR" in the figure), a fuel cell 14 (indicated as "FC") and a DC-DC converter 16 and inverter 20 that are interposed between the fuel cell 14 and rotating machine 12.

The rotating machine 12 comprises a brushless AC synchronous motor and upon being supplied with a current, transmits a rotational output to a wheel (driven wheel) 22 through a connecting shaft S to make the vehicle 10 move. The rotating machine 12 has a regenerative function that converts kinetic energy generated with rotation of the connecting shaft S into electric energy and outputs it during deceleration. Specifically, the rotating machine 12 serves as a motor when rotated by current supply and as a generator when rotated by being driven by the wheel 22.

The fuel cell 14 is a known polymer electrolyte fuel cell having a stack formed by being stacked with a plurality of single cells constituted by an electrolyte membrane (solid polymer membrane), a cathode electrode (air electrode) and anode electrode (fuel electrode) that sandwich the electrolyte membrane, separators provided on the outer side of the electrodes, and other components (none of which are shown). The fuel cell 14 is connected to an air supply system and fuel supply system (neither shown) to be supplied with air (oxygen gas) and fuel (hydrogen gas), thereby generating power.

The DC-DC converter 16 has a low-voltage port 16a connected to the fuel cell 14 and a high-voltage port 16b connected to the inverter 20, and further has first and second capacitors 16c1, 16c2, an inductor 16d, a transformer 16e, first to fourth IGBTs (Insulated-Gate Bipolar Transistors; switching elements) 16f1 to 16f4 and diodes 16g1 to 16g4 respectively parallel-connected to the IGBTs 16f1 to 16f4, which are installed between the low-voltage port 16a and high-voltage port 16b.

Each of the low-voltage and high-voltage ports 16a, 16b has a positive electrode terminal 16a1, 16b1 and negative electrode terminal 16a2, 16b2. The positive electrode terminals 16a1, 16b1 are interconnected by a positive electrode wire 16h, while the negative electrode terminals 16a2, 16b2 are interconnected by a negative electrode wire 16i. The positive electrode wire 16h is branched at a stage downstream of the inductor 16d and connected to the transformer 16e, and then the branched lines are joined together at a stage downstream of the transformer 16e and connected to the positive electrode terminal 16b1. The branch point is hereinafter called the "first common terminal" and assigned by 16k1, while the joining point is called the "second common terminal" and assigned by 16k2.

Figure 2:
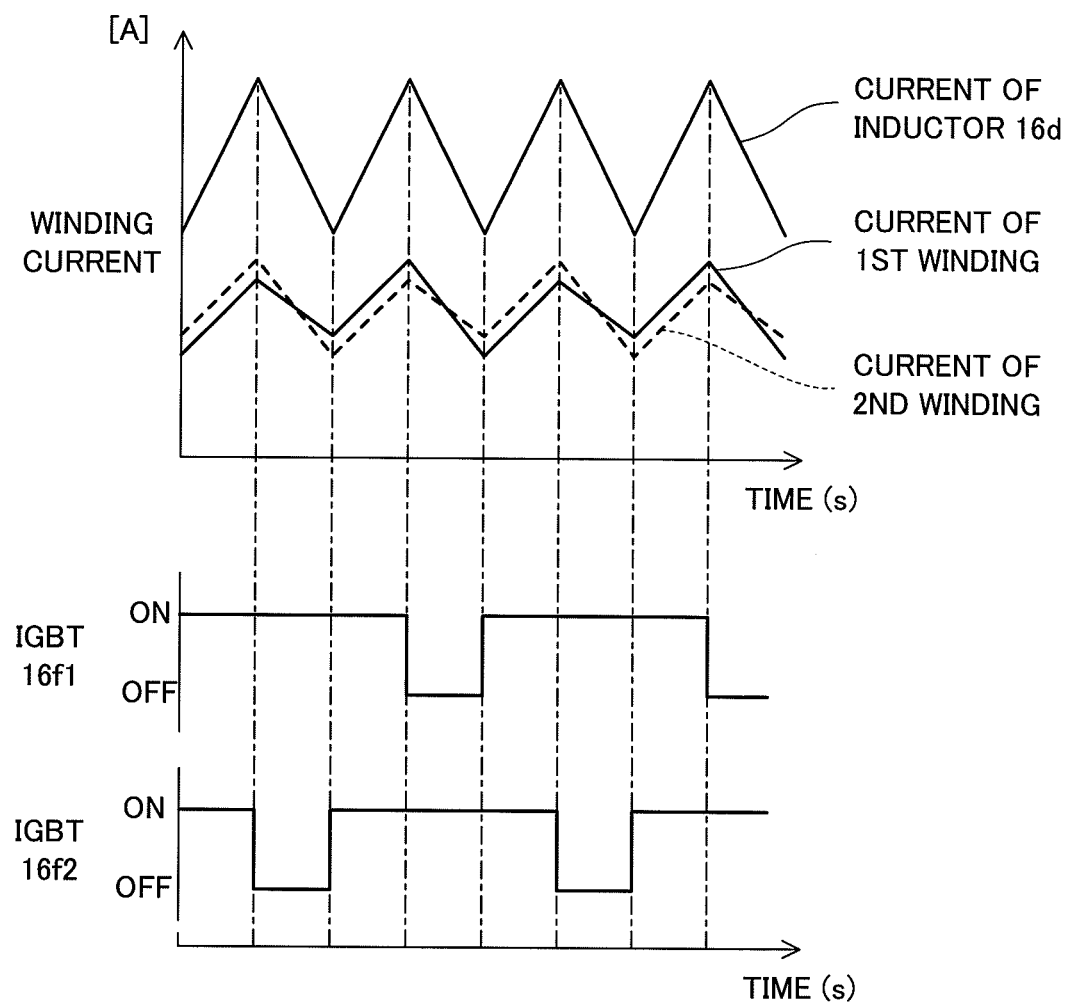
FIG. 2 is current waveforms in the case where an inductor shown in FIG. 1 has fourfold boosting capability.

The first capacitor 16c1 is interposed between the positive and negative electrode wires 16h, 16i to smooth a current outputted from the fuel cell 14. The inductor 16d is provided at the positive electrode wire 16h with its one end connected to the positive electrode terminal 16a1 of the low-voltage port 16a and its other end connected to the transformer 16e through the first common terminal 16k1. The inductor 16d has boosting capability of, for instance, one to n time(s) (a current waveform of the inductor 16d when n is 4 is shown in FIG. 2 as one example). In the case where only the transformer 16e is used, a current may be sharply changed; however, a rate of change can be arbitrarily regulated by the value of inductance of the inductor 16d.

Figure 3:
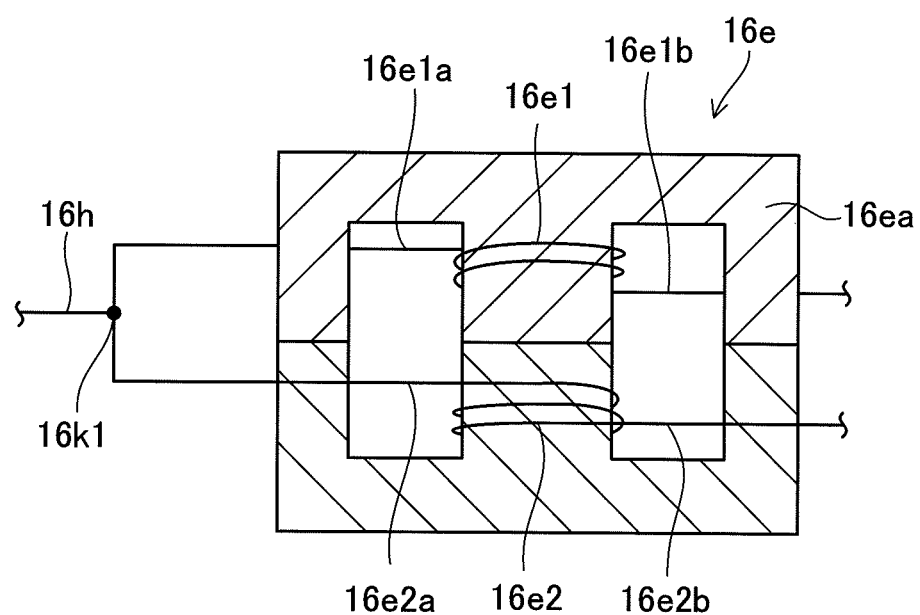
FIG. 3 is an explanatory view schematically showing a transformer shown in FIG. 1.

FIG. 3 is an explanatory view schematically showing the transformer 16e shown in FIG. 1.

As shown in FIGS. 1 and 3, the transformer 16e has a core 16ea and first and second windings 16e1, 16e2 that are connected and wound around the core 16ea in reverse directions from each other (i.e., reverse-wound connection).

To be specific, the core 16ea comprises a core, for instance, an EE-shape core made of ferrite, etc., that allows such a reverse-wound connection. The first and second windings 16e1, 16e2 are magnetically connected via the core 16ea and the ratio of winding thereof is set as 1:1, for instance.

The first and second windings 16e1, 16e2 are connected, at one ends 16e1a, 16e2a, to the positive electrode terminal 16a1 of the low-voltage port 16a through the first common terminal 16k1 and are connected, at the other ends 16e1b, 16e2b, to the positive electrode terminal 16b1 of the high-voltage port 16b through the second common terminal (common terminal) 16k2.

The coupling degree k of the transformer 16e is configured to be closer to 1 to the maximum extent. In FIG. 1, dots given near the windings indicate sides that are to have higher electric potential when voltage is induced. Since the transformer 16e is configured as mentioned above, when the first and second windings 16e1, 16e2 are supplied with current, the magnetic fluxes generated at the windings are cancelled out by each other, which will be explained later.

The first IGBT 16f1 is interposed between the other end 16e1b of the first winding 16e1 and the negative electrode wire 16i, while the second IGBT 16f2 is interposed between the other end 16e2b of the second winding 16e2 and the negative electrode wire 16i. More specifically, a collector terminal (hereinafter called the "collector") of the first IGBT 16f1 is connected to the other end 16e1b of the first winding 16e1 and an emitter terminal (hereinafter called the "emitter") thereof is connected to the negative electrode wire 16i. A collector of the second IGBT 16f2 is connected to the other end 16e2b of the second winding 16e2 and an emitter thereof is connected to the negative electrode wire 16i. Gate terminals (hereinafter called the "gate(s)") of the first and second IGBTs 16f1, 16f2 are connected to an Electronic Control Unit (ECU; explained later) through signal lines.

An anode terminal (hereinafter called the "anode") of the diode 16g1 is connected to the emitter of the first IGBT 16f1 and a cathode terminal (hereinafter called the "cathode") thereof to the collector thereof. An anode of the diode 16g2 is connected to the emitter of the second IGBT 16f2 and a cathode thereof to the collector thereof.

An emitter of the third IGBT 16f3 is connected to the other end 16e1b of the first winding 16e1 and a collector thereof is connected to the second common terminal 16k2. An emitter of the fourth IGBT 16f4 is connected to the other end 16e2b of the second winding 16e2 and a collector thereof is connected to the second common terminal 16k2. Gates of the third and fourth IGBTs 16f3, 16f4 are also connected to the ECU through signal lines.

Similarly, an anode of the diode 16g3 is connected to the emitter of the third IGBT 16f3 and a cathode thereof to the collector thereof. An anode of the diode 16g4 is connected to the emitter of the fourth IGBT 16f4 and a cathode thereof to the collector thereof.

The second capacitor 16c2 is interposed between the positive and negative electrode wires 16h, 16i, more exactly, between the positive electrode wire (indicated by 16h1 in FIG. 1) connecting the second common terminal 16k2 with the positive electrode terminal 16b1 of the high-voltage port 16b and the negative electrode wire 16i, to smooth power outputted from the transformer 16e.

The inverter 20 comprises a three-phase bridge circuit (not shown) and inverts a direct current boosted by the DC-DC converter 16 into a three-phase alternating current to supply to the rotating machine 12, while converting an alternating current generated through the regenerating operation of the rotating machine 12 into a direct current to supply to a battery (not shown).

A current sensor (current detecting means) 24 is connected to the positive electrode wire 16h1 (more precisely, a certain location of the positive electrode wire 16h1 between the second common terminal 16k2 and a connecting point 161 where the second capacitor 16c2 is connected) and produces an output or signal proportional to a current I flowing through the current sensor 24. The current sensor 24 is a sensor that can detect a direct current (DC) component and an alternating current (AC) component of the current I.

The output of the current sensor 24 is sent to the ECU (now assigned by reference numeral 30) mounted on the vehicle 10. The ECU 30 has a microcomputer including a CPU, ROM, RAM and other devices.

Based on the inputted output of the current sensor 24, the ECU 30 controls the operations of the first and second IGBTs 16f1, 16f2. To be more specific, the ECU 30 calculates a current difference of the first and second windings 16e1, 16e2 based on the current detected by the current sensor 24, and controls the operations of the first and second IGBTs 16f1, 16/2 based on the calculated current difference, thereby carrying out the boosting operation of the DC-DC converter 16.

The boosting operation of the DC-DC converter 16 will be explained with reference to FIGS. 1 and 4, with focus on a flow of current. The DC-DC converter 16 boosts DC voltage inputted from the fuel cell 14 through the low-voltage port 16a by turning ON and Off the first and second IGBTs 16/1, 16/2 with a phase difference of 180 degrees, and outputs the boosted DC voltage to the inverter 20 through the high-voltage port 16b.

Specifically, when an ON signal is inputted to the gate of the first IGBT 16/1 from the ECU 30 and an OFF signal is inputted to the gate of the second IGBT 16/2 from the same, as shown in FIG. 1, an exciting current I1 flows through the first winding 16e1 of the transformer 16e. It is assumed that the third and fourth IGBTs 16/3, 16/4 are in the OFF state, or that the third IGBT 16/3 is inputted with an ON or OFF signal opposite from a signal inputted to the first IGBT 16/1 and the fourth IGBT 16/4 inputted with an ON or OFF signal opposite from a signal inputted to the second IGBT 16/2 (after dead time).

The exciting current I1 flows to the negative electrode terminal 16a2 through the positive electrode terminal 16a1 of the low-voltage port 16a, inductor 16d, first common terminal 16k1, first winding 16e1 and first IGBT 16/1. The exciting current I1 gradually increases during the IGBT 16/1 being in the ON state and gradually decreases once the IGBT 16/1 is turned OFF.

The exciting current I1a when the IGBT 16/1 is turned OFF is indicated by an arrow of a long and two short dashed line in FIG. 1. The exciting current I1a is a current that, in the case where the IGBT 16/2 is in the OFF state, flows upon the release of energy accumulated at the inductor 16d during a period that the IGBT 16/1 is in the ON state, and in the case where the IGBT 16/2 is in the ON state, flows upon the release of energy magnetically transmitted through the transformer 16e in response to a magnetizing current caused by the flow of a current I3 shown in FIG. 4. The exciting current I1a flows to the positive electrode terminal 16b1 through the first winding 16e1, diode 16g3 and second common terminal 16k2.

When the exciting current I1 flows through the first winding 16e1, an excitation (induced) current I2 (indicated by an arrow of long and dashed line in FIG. 1) flows through the second winding 16e2 due to mutual induction. The excitation current I2 flows to the positive electrode terminal 16b1 through the positive electrode terminal 16a1, inductor 16d, first common terminal 16k1, second winding 16e2, diode 16g4 and second common terminal 16k2. At that time, the second capacitor 16c2 is charged with the excitation current I2 and consequently, the DC voltage boosted by the inductor 16d and transformer 16e is outputted from the high-voltage port 16b.

Figure 4:
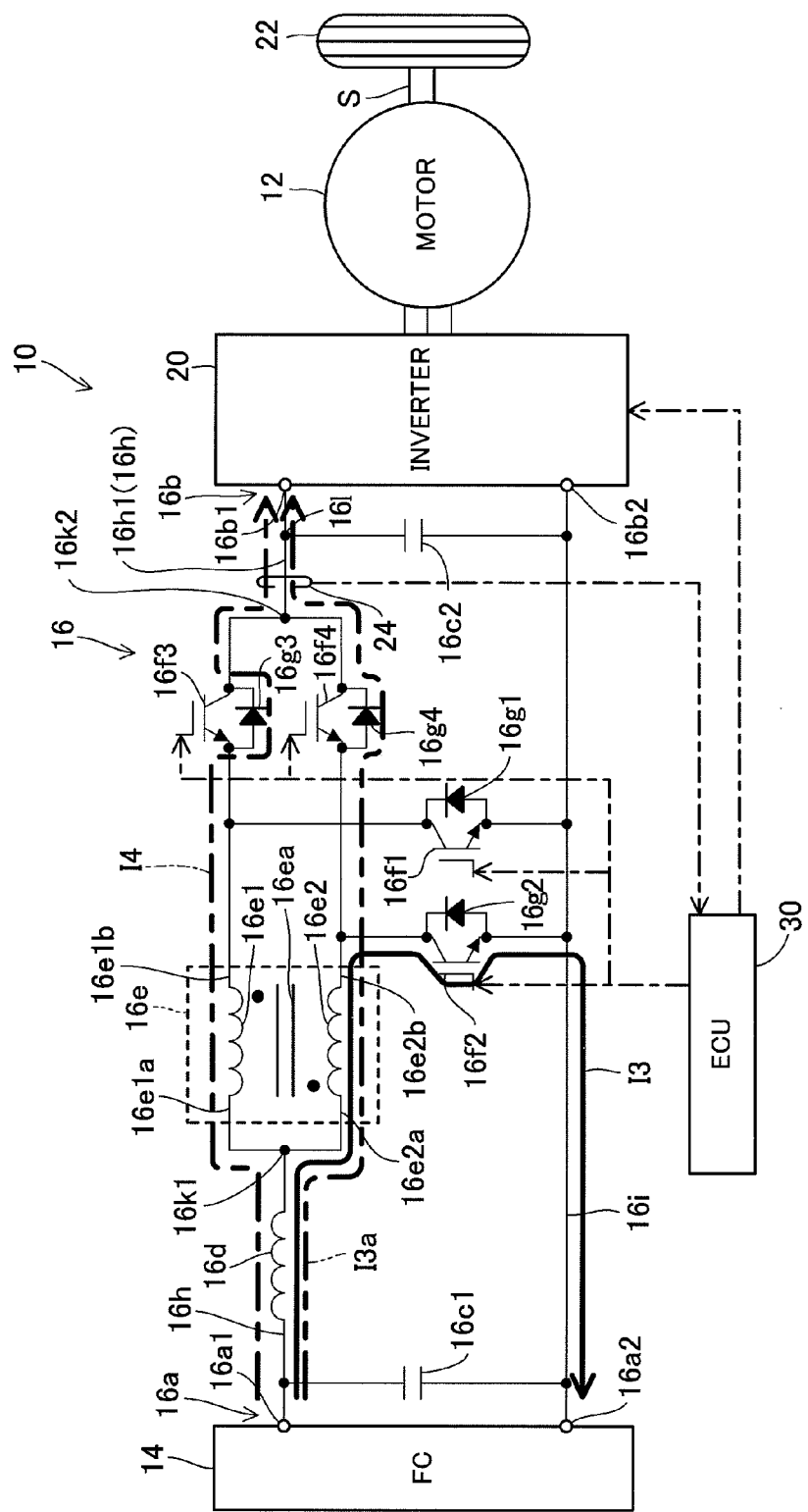
FIG. 4 is a schematic view similar to FIG. 1, showing the apparatus shown in FIG. 1.

On the other hand, when the first IGBT 16/1 is turned OFF and the second IGBT 16/2 is turned ON, as shown in FIG. 4, an exciting current I3 flows through the second winding 16e2 of the transformer 16e. Specifically, the exciting current I3 flows to the negative electrode terminal 16a2 through the positive electrode terminal 16a1 of the low-voltage port 16a, inductor 16d, first common terminal 16k1, second winding 16e2 and second IGBT 16/2. It is assumed that the third and fourth IGBTs 16/3, 16/4 remain in the OFF state.

Similarly to the exciting current I1, the exciting current I3 gradually increases during the IGBT 16/2 being in the ON state and gradually decreases once the IGBT 16/2 is turned OFF. The exciting current I3a (when the IGBT 16/2 is turned OFF) is indicated by an arrow of a long and two short dashed line. The exciting current I3a is also a current that flows upon the release of energy accumulated at the inductor 16d during a period that the IGBT 16/2 is in the ON state. The exciting current I3a flows to the positive electrode terminal 16b1 through the second winding 16e2, diode 16g4 and second common terminal 16k2.

When the exciting current I3 flows through the second winding 16e2, an excitation (induced) current I4 (indicated by an arrow of long and dashed line in FIG. 4) flows through the first winding 16e1. The excitation current I4 flows to the positive electrode terminal 16b1 through the positive electrode terminal 16a1, inductor 16d, first common terminal 16k1, first winding 16e1, diode 16g3 and second common terminal 16k2. At that time, the second capacitor 16c2 is charged with the excitation current I4 and consequently, the DC voltage boosted by the inductor 16d and transformer 16e is outputted from the high-voltage port 16b to the inverter 20.

As is clear from the foregoing explanation, through the positive electrode wire 16h1 installed with the current sensor 24, the excitation current I2 which is the same as that flows through the second winding 16e2 flows when the first IGBT 16/1 is solely turned ON, and the excitation current I4 which is the same as that flows through the first winding 16e1 flows when the second IGBT 16/2 is solely turned ON.

In the aforementioned boosting operation of the DC/DC converter 16, upon turning ON and OFF the first and second IGBTs 16/1, 16/2, when the exciting current I1 flows through the first winding 16e1, the excitation current I2 flows through the second winding 16e2 having the reverse wound direction from the first winding 16e1 in a direction to cancel magnetization of the core 16e a, while when the exciting current I3 flows through the second winding 16e2, the excitation current I4 flows through the first winding 16e1 in a direction to cancel magnetization of the core 16ea.

Since directions of magnetic fluxes generated at the first and second windings 16e1, 16e2 of the transformer 16e become opposite from each other so that the magnetism is canceled out at the core 16ea, the core 16e a is less likely to be magnetically saturated. Thus, since the DC-DC converter 16 has the magnetic-field canceling type transformer 16e that employs a small number of windings and small size of core, it is possible to deal with relatively large electric power while the entire DC-DC converter 16 can be compact.

Figure 9:
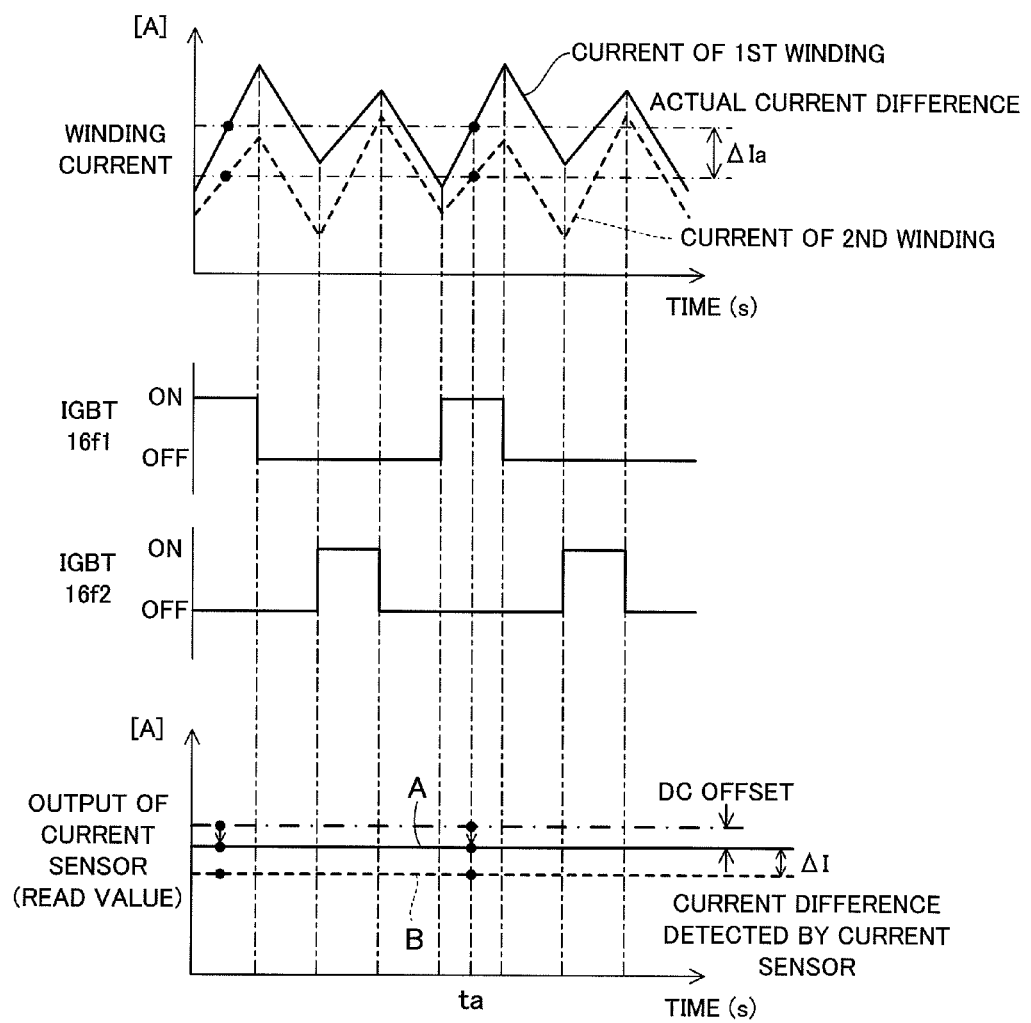
FIG. 9 is an explanatory view showing currents of windings detected in a DC-DC converter control apparatus according to a prior art and a current difference therebetween.

Here, the object of this invention will be again explained. FIG. 9 is an explanatory view showing currents at the windings detected in a DC-DC converter control apparatus in a prior art and a current difference therebetween.

In the boosting operation of the DC-DC converter 16, if the ideal operation is performed in the DC-DC converter 16, winding currents (more precisely, direct current components thereof) flowing through the first and second windings 16e1, 16e2 are to be constantly equal to each other. However, due to performance variability or dispersion of the IGBTs 16/1, 16/2, parasitic resistance existing in various parts in the circuit, etc., a current difference $\Delta I$ occurs between the winding currents.

The relationship between the current difference $\Delta I$ and magnetic flux density B generated in the core of the transformer 16e can be expressed by the following equation.

$$\text{Magnetic flux density } B = \mu N \Delta I / l \qquad \text{Eq. 1}$$

In the equation 1, $\mu$ is magnetic permeability of a core material, N is a number of turns of the winding, and l is the length of a magnetic path.

As is clear from the equation 1, when the current difference $\Delta I$ becomes large, the magnetic flux density B also becomes high in proportion. Since the high magnetic flux density B requires larger size of the core 16ea so as to prevent the magnetic flux density B from exceeding the maximum saturation magnetic flux density Bmax, it is preferable to control the operations of the IGBTs to reduce the current difference ΔI as much as possible.

Therefore, in the technique of the patent reference 1, as indicated by imaginary lines in FIG. 1, current sensors A, B are installed downstream of the first and second windings 16e1, 16e2 and it is configured to detect currents of the windings by the current sensors A, B to calculate the current difference ΔI and control the operations of the IGBTs so that the calculated current difference ΔI becomes zero.

Generally, current sensors have manufacturing dispersion so that offsets exist in their outputs and amount or extent of the offsets are not the same. Note that, for ease of understanding, FIG. 9 shows the case where the offset exists only with the current sensor A. Further, the current of the first winding 16e1 and the output of the current sensor A are indicated by solid lines, while the current of the second winding 16e2 and the output of the current sensor B are indicated by dashed lines.

Consequently, when the currents of the windings are detected from the outputs of the current sensors A, B at the time to and the current difference ΔI is calculated based on the detected current, since the offset amounts of the sensors are different from each other, it causes an error between the calculation result and the actual current difference ΔIa accordingly and therefore, the operations of the IGBTs may not be appropriately controlled. In addition, in the case where the error exists, even if the operations of the IGBTs are controlled so that the current difference ΔI becomes zero, a magnetic flux resulting from the error (i.e., current) resides in the transformer. Accordingly, in order to avoid magnetic saturation of the transformer to be caused by the residual magnetic flux, the transformer needs to be increased in size, disadvantageously.

The object of this invention is to overcome the above problems by providing the apparatus that can appropriately control the operations of the IGBTs by accurately detecting the currents of the windings without increasing the transformer in size.

Figure 5:
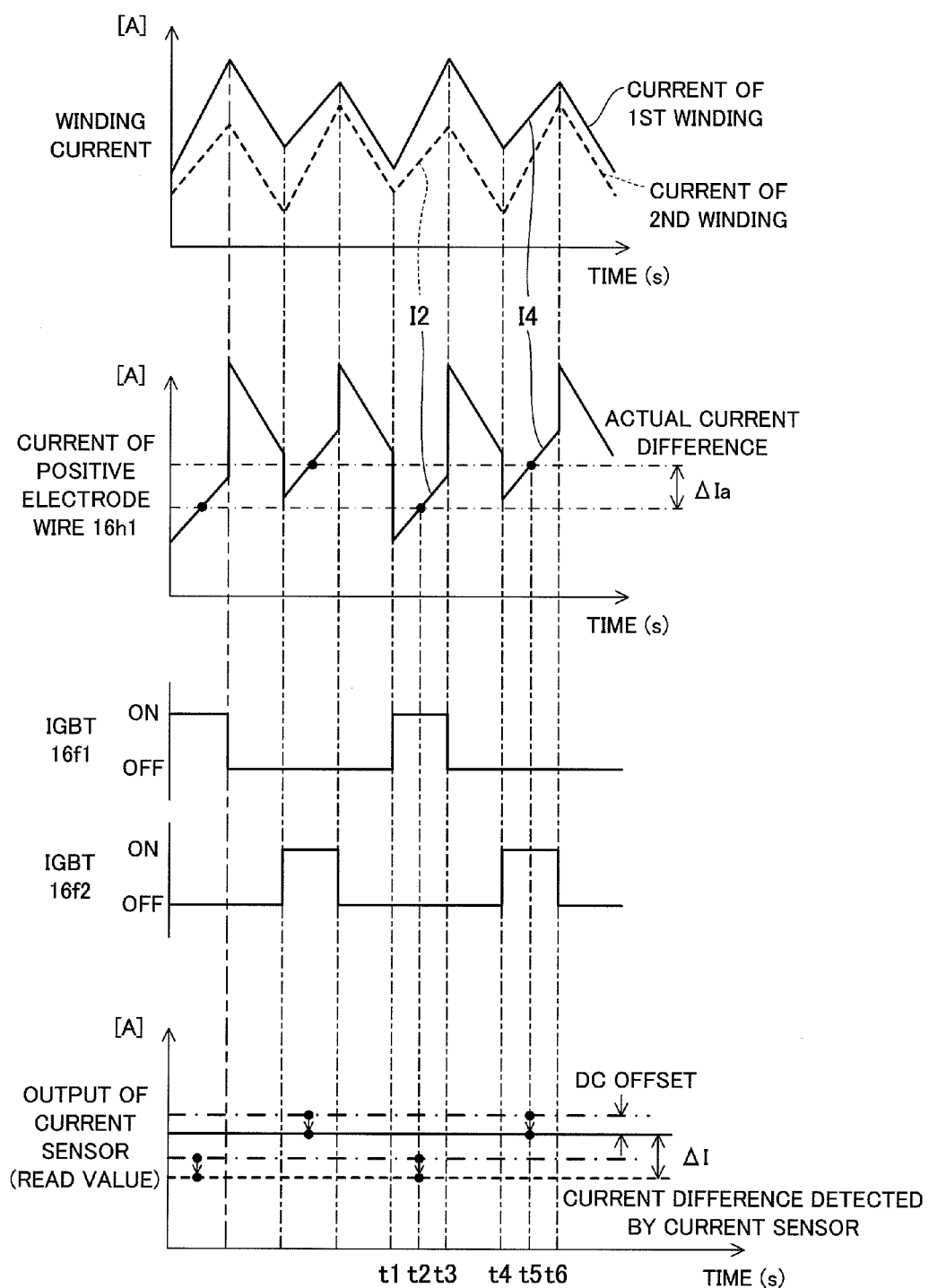
FIG. 5 is an explanatory view showing currents of windings detected in the apparatus shown in FIG. 1 and a current difference therebetween.
Figure 6:
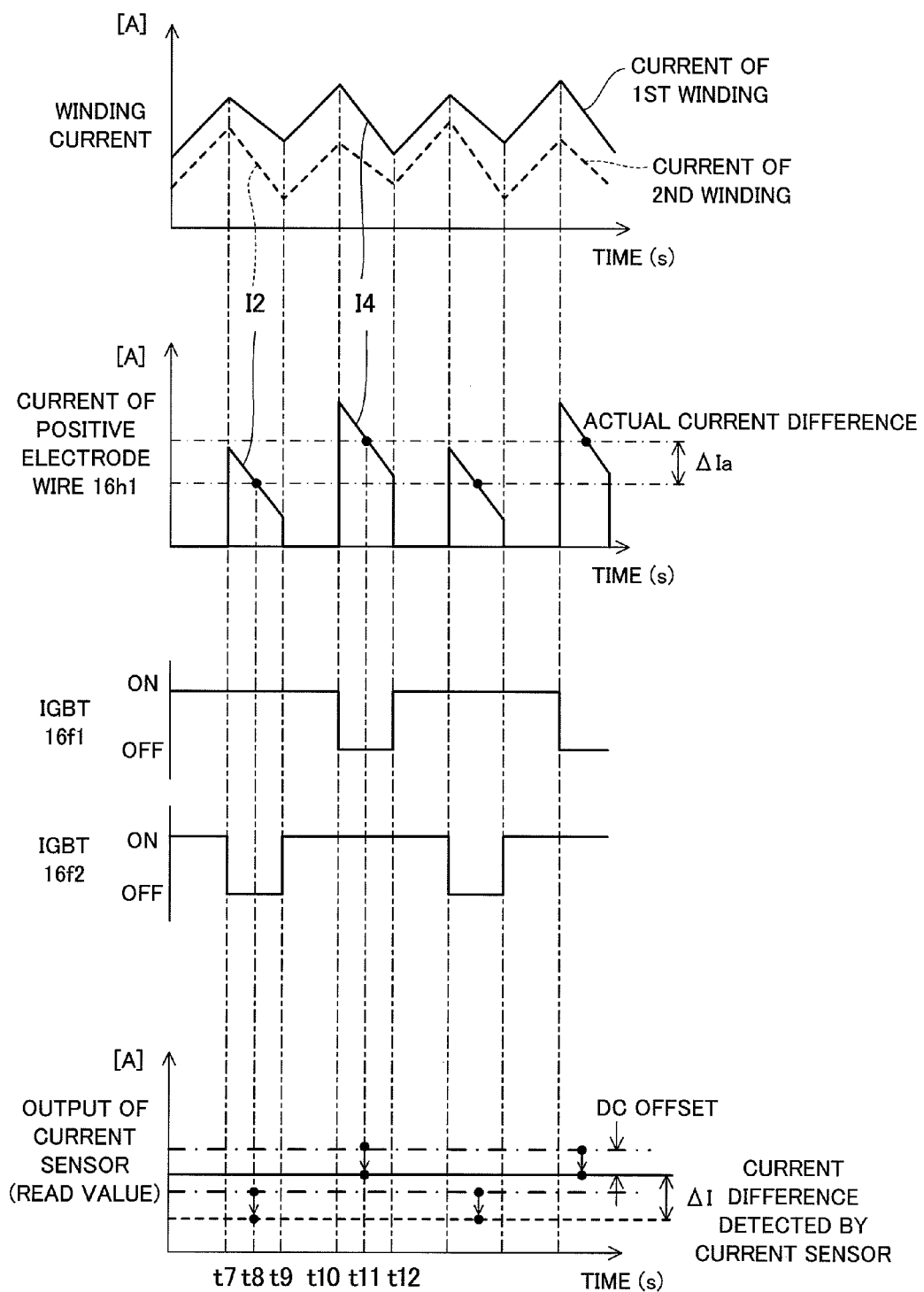
FIG. 6 is an explanatory view similar to FIG. 5, showing the currents of the windings detected in the apparatus shown in FIG. 1 and the current difference therebetween.

FIG. 5 is an explanatory view showing the currents at the windings detected in the apparatus according to this invention and the current difference therebetween, and FIG. 6 is an explanatory view showing the currents at the windings and the current difference therebetween when a boosting ratio of the inductor 16d is set to be two times or more. In FIGS. 5 and 6, there are shown, in order from the top, the winding currents of the first and second windings 16e1, 16e2, the current of the positive electrode wire 16h1 that is installed with the current sensor 24, the ON/OFF states of the IGBTs 16f1, 16f2 and the output (read value; DC component) of the current sensor 24.

As shown in FIG. 5, when the first IGBT 16f1 is in the ON state and the second IGBT 1612 is in the OFF state during a period from the time t1 to the time t3, as mentioned above, the current (excitation current) I2 which is the same as that flows through the second winding 16e2 flows through the positive electrode wire 16h1. Accordingly, when the current flowing through the positive electrode wire 16h1 is detected by the current sensor 24 at the appropriate timing between the time t1 and time t3 (e.g., at the time t2 that is the midpoint of the period therebetween), the current I2 of the second winding 16e2 can be detected.

Similarly, when the first IGBT 16f1 is in the OFF state and the second IGBT 16f2 is in the ON state during a period from the time t4 to the time t6, the current (excitation current) I4 which is the same as that flows through the first winding 16e1 flows through the positive electrode wire 16h1. Accordingly, when the current flowing through the positive electrode wire 16h1 is detected at the appropriate timing between the time t4 and time t6 (e.g., at the time t5 that is the midpoint of the period therebetween), the current I4 of the first winding 16e1 can be detected.

Further, as shown in FIG. 6, also in the case where the inductor 16d has the boosting capability of two times or more, during a period from the time t7 to the time t9 in which the first IGBT 16f1 is in the ON state and the second IGBT 16f2 is in the OFF state, the current I2 which is the same as that flows through the second winding 16e2 flows through the positive electrode wire 16h1. Accordingly, when the current flowing through the positive electrode wire 16h1 is detected at the appropriate timing between the time t7 and time t9 (e.g., at the time t8 that is the midpoint of the period therebetween), the current I2 of the second winding 16e2 can be detected.

Subsequently, during a period from the time t10 to the time t12 in which the first IGBT 16f1 is in the OFF state and the second IGBT 16f2 is in the ON state, the current I4 which is the same as that flows through the first winding 16e1 flows through the positive electrode wire 16h1. Accordingly, when the current flowing through the positive electrode wire 16h1 is detected at the appropriate timing between the time t10 and time t12 (e.g., at the time t11 that is the midpoint of the period therebetween), the current I4 of the first winding 16e1 can be detected.

Thus, the currents of the first and second windings 16e1, 16e2 can be accurately detected by detecting the current flowing through the positive electrode wire 16h1 using the single current sensor 24 at the appropriate timing. Further, in the case where the current difference ΔI is calculated from the thus-detected currents of the first and second windings 16e1, 16e2, since the single current sensor 24 is used, all the detected values have the same amounts of offsets so that an error to be caused by difference in the offset amounts does not occur, whereby it becomes possible to obtain the same difference (current difference ΔI) as the actual current difference ΔIa.

Then the ECU 30 duty-ratio-controls the operations of the first and second IGBTs 16f1, 16f2 so that the calculated current difference ΔI becomes zero.

Thus, the first embodiment is configured to have the current sensor 24 that detects the current flowing through the positive electrode wire 16h1 connecting the second common terminal 16k2 installed downstream of the first and second windings 16e1, 16e2 of the magnetic-field canceling type transformer 16e with the positive electrode terminal 16b1 of the high-voltage port 16b, and such that the operations of the first and second IGBTs (switching elements) 16f1, 16f2 are controlled based on the current detected by the current sensor 24. With this, it becomes possible to accurately detect the currents (I2, I4) of the windings 16e1, 16e2 and appropriately control the operations of the IGBTs 16f1, 16f2 based on the detected currents without increasing the transformer 16e in size.

To be more specific, since there exists a period in which the same current as that flows through the first or second winding 16e1, 16e2 in accordance with the ON/OFF states of the IGBTs 16f1, 16f2, flows through the positive electrode wire 16h1, the currents of the first and second windings 16e1, 16e2 can be accurately determined by detecting the current flowing through the positive electrode wire 16h1 using the current sensor 24 at the appropriate timing. Further, since, without using a plurality of current sensor, the single current sensor 24 is provided at the positive electrode wire 16h1 to detect the currents of the windings 16e1, 16e2, the structure can be made simple. Also, even when the current difference ΔI of the first and second windings 16e1, 16e2 is to be calculated, since an error to be caused by difference in the offset amounts does not occur between the calculated current difference ΔI and actual current difference ΔIa, i.e., a magnetic flux resulting from the error (i.e., current) does not reside in the transformer 16e, it is not necessary to increase the transformer 16e in size, while it is advantageous in cost.

Further, the current detecting means comprises the current sensor 24 that is capable of detecting a direct current (DC) component of the current flowing through the positive electrode wire 16h1. Since the sum of detected two current values (current values of the first and second windings) becomes equal to an inputted current value of the DC-DC converter 16, the current sensor 24 can be used for current feedback control and/or over-current detection of inputted current. With this, a current sensor for detecting only the inputted current can be removed, thereby enabling to make the circuit structure simple and suppress the cost.

Similarly, since the current detecting means comprises the current sensor 24 that is capable of detecting the direct current (DC) component of the current so that an average of the two detected current values becomes equal to an outputted current value of the DC-DC converter 16, the current sensor 24 can be used for current feedback control and/or over-current detection of outputted current. With this, it becomes possible to detect the inputted and outputted current of the DC-DC converter 16 by this single current sensor 24. On the contrary, if a current sensor that can only detect an alternating current (AC) component of the current is employed as the current sensor 24, it would merely work to maintain a current balance.

Further, the current difference ΔI of the first and second windings 16e1, 16e2 is calculated based on the detected currents and the operations of the first and second IGBTs 16f1, 16f2 are controlled based on the calculated current difference ΔI, more specifically, the operations of the first and second IGBTs 16f1, 16f2 are controlled such that the calculated current difference ΔI becomes zero. With this, it becomes possible to surely decrease the magnetic flux density B at the core of the transformer 16e that could vary in accordance with the current difference ΔI, while decreasing the core in size.

Further, since the DC-DC converter 16 is mounted on the fuel-cell vehicle 10, the foregoing effects can be achieved in the fuel cell vehicle 10

Second Embodiment

Next, a DC-DC converter control apparatus according to a second embodiment of the invention will be explained.

The explanation will be made with focus on points of difference from the first embodiment. In the second embodiment, the DC-DC converter 16 is mounted on a hybrid vehicle (Hybrid Electric Vehicle (HEV)).

Figure 7:
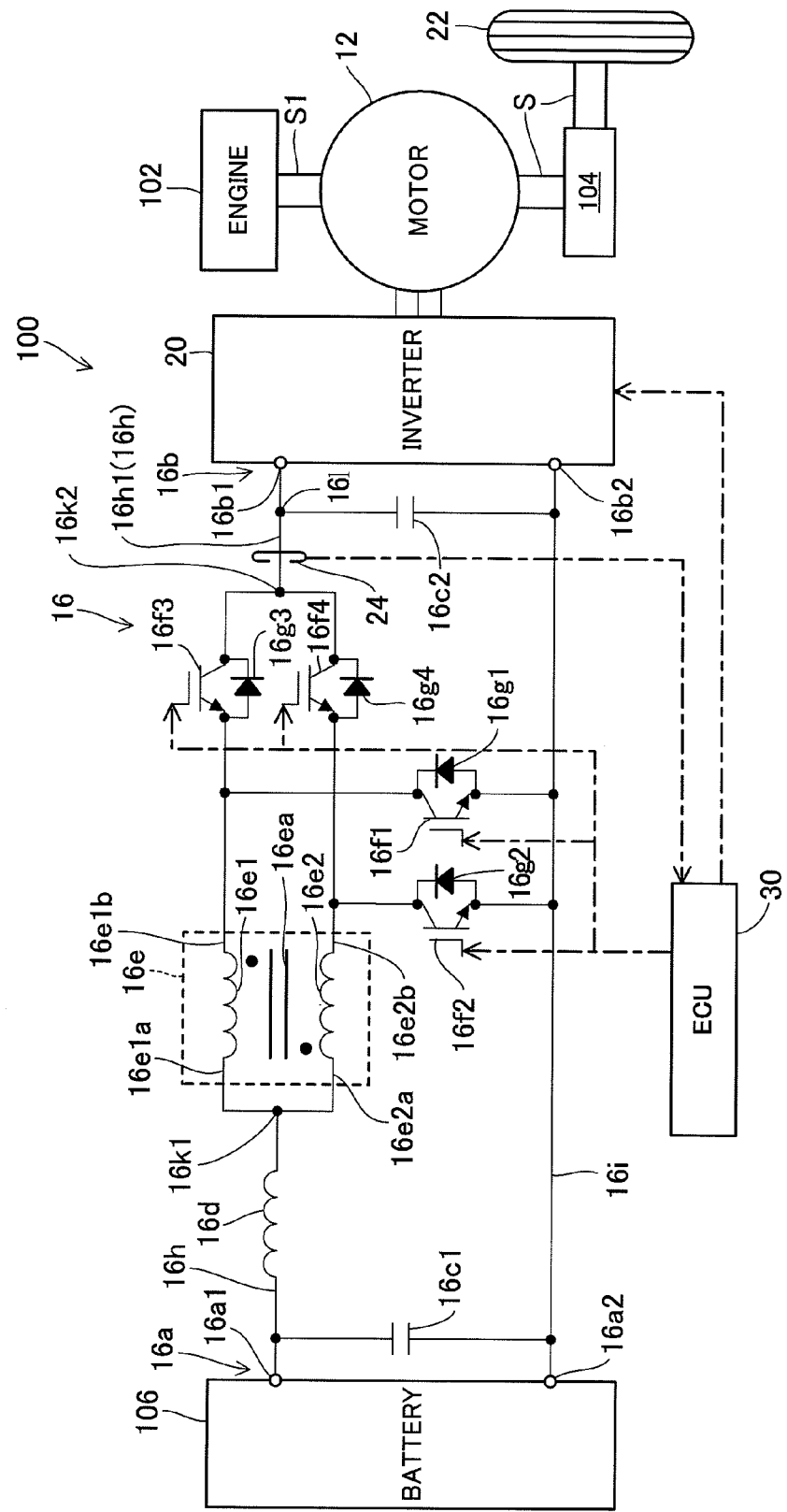
FIG. 7 is an overall schematic view similar to FIG. 1, but showing a DC-DC converter control apparatus according to a second embodiment of this invention.

FIG. 7 is an overall schematic view similar to FIG. 1, but showing the DC-DC converter control apparatus according to the second embodiment.

As shown in FIG. 7, the hybrid vehicle 100 has an internal combustion engine 102 in addition to the rotating machine 12 as prime movers. The engine 102 comprises a gasoline-injection, spark-ignition, four-cylinder engine and is connected to the rotating machine 12 through a drive shaft S1. Outputs of the rotating machine 12 and engine 102 are inputted to a transmission 104. The transmission 104 changes the outputs in speed to transmit them to the wheel 22.

Further, the hybrid vehicle 100 is installed with a battery 106 in place of the fuel cell 14 used in the first embodiment. The battery 106 includes a secondary battery such as a lithium ion battery.

Since the remaining configuration is the same as that in the first embodiment, the explanation thereof will not be made.

Thus, in the second embodiment, since the DC-DC converter 16 is mounted on the hybrid vehicle 100, the same effects as in the first embodiment can be achieved in the hybrid vehicle 100.

Third Embodiment

Next, a DC-DC converter control apparatus according to a third embodiment of the invention will be explained.

The explanation will be made with focus on points of difference from the first embodiment. In the third embodiment, the DC-DC converter 16 is mounted on an Electric Vehicle (EV).

Figure 8:
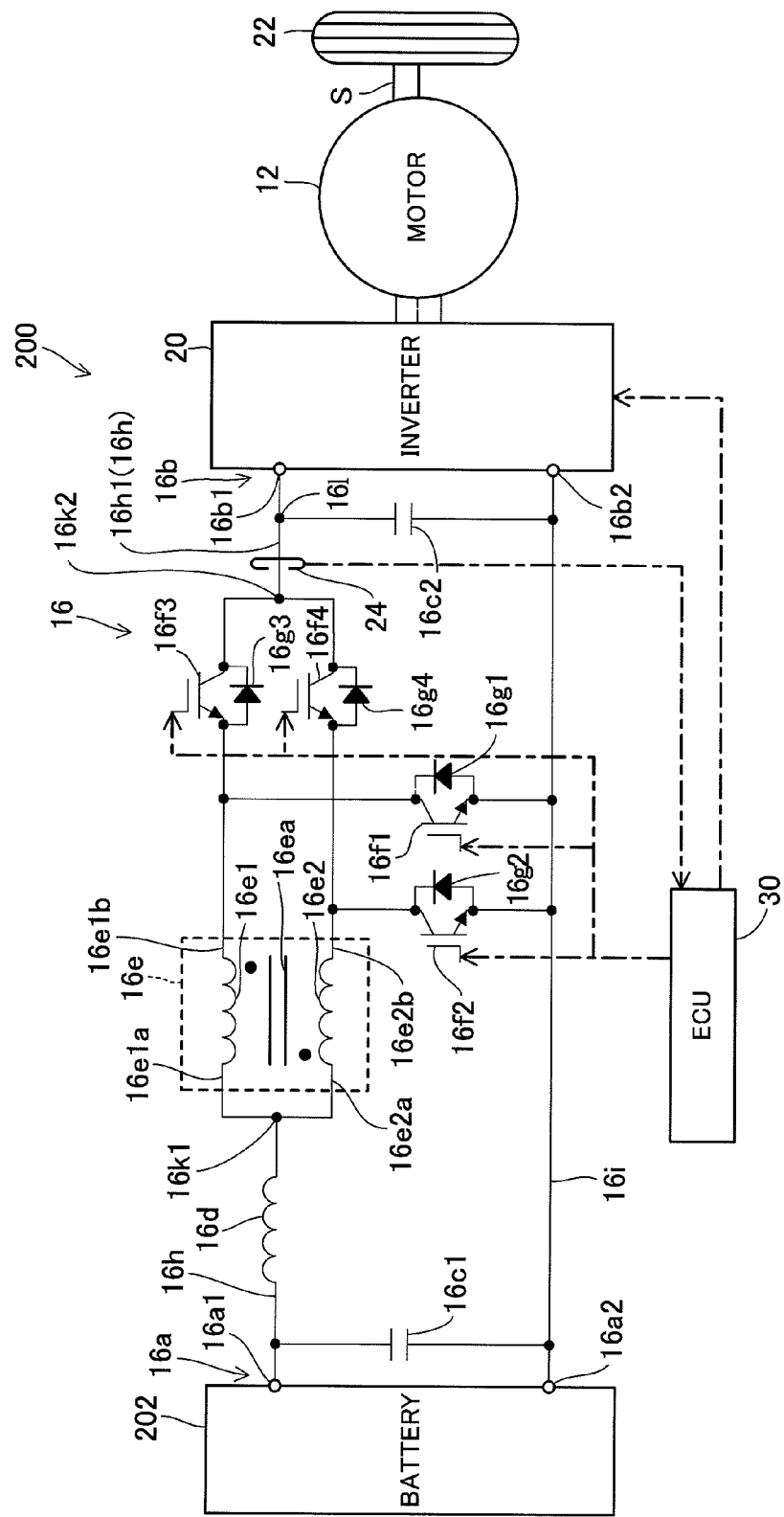
FIG. 8 is an overall schematic view similar to FIG. 1, but showing a DC-DC converter control apparatus according to a third embodiment of this invention.

FIG. 8 is an overall schematic view similar to FIG. 1, but showing the DC-DC converter control apparatus according to the third embodiment.

As shown in FIG. 8, the electric vehicle 200 is installed with a battery 202 in place of the fuel cell 14 used in the first embodiment. Similarly to the second embodiment, the battery 202 comprises a secondary battery such as a lithium ion battery.

Thus, in the third embodiment, the DC-DC converter 16 is mounted on the electric vehicle 200. With this, similarly to the first embodiment, it becomes possible to accurately detect the currents of the windings 16e1, 16e2 and appropriately control the operations of the IGBTs 16f1, 16f2 based on the detected currents without increasing the transformer 16e in size.

Since the remaining configuration is the same as that in the first embodiment, the explanation thereof will not be made.

As stated above, the first to third embodiments are configured to have an apparatus for controlling a DC-DC converter having a magnetic-field canceling type transformer 16e including first and second windings 16e1, 16e2 wound in reverse directions, each of the windings 16e1, 16e2 being connected to a positive electrode terminal 16a1 of a low-voltage port 16a at one end 16e1a, 16e2a and connected to a positive electrode terminal 16b1 of a high-voltage port 16b through a common terminal (second common terminal) 16k2 at other end 16e1b, 16e2b; a first switching element (IGBT) 16f1 interposed between the other end of the first winding and a negative electrode wire 16i connecting a negative electrode terminal 16a2 of the low-voltage port with a negative electrode terminal 16b2 of the high-voltage port; and a second switching element (IGBT) 16f2 interposed between the other end of the second winding and the negative electrode wire, characterized by: current detecting means (current sensor 24) for detecting a current flowing through a positive electrode wire 16h1 connecting the common terminal with the positive electrode terminal of the high-voltage port; and control means (ECU 30) for controlling operations of the first and second switching elements based on the current detected by the current detecting means.

In addition, it is configured such that the current detecting means comprises a current sensor 24 capable of detecting a direct current component of the current flowing through the positive electrode wire 16h1.

In addition, it is configured such that the control means calculates a current difference ΔI of the first and second windings 16e1, 16e2 based on the detected current and controls the operations of the first and second switching elements 16f1, 16f2 based on the calculated current difference ΔI.

In addition, it is configured such that the control means calculates the current difference ΔI of the first and second windings 16e1, 16e2 based on the detected current and controls the operations of the first and second switching elements 16f1, 16f2 such that the calculated current difference ΔI becomes zero.

In addition, in the second embodiment, in the first embodiment, it is configured such that the DC-DC converter 16 is mounted on a fuel cell vehicle 10.

In addition, in the second embodiment, it is configured such that the DC-DC converter 16 is mounted on a hybrid vehicle 100.

In addition, in the third embodiment, it is configured such that the DC-DC converter 16 is mounted on an electric vehicle 200.

It should be noted that, although the two-phase transformer 16e is used in the aforementioned DC-DC converter 16, a three-phase transformer may instead be employed.

It should also be noted that, although the core 16ea of the transformer 16e is configured to be the EE-shape core, it may be other types such as an EI-shape core, UI-shape core, etc. It suffices if the aforesaid reverse-wound connection is applicable and directions of magnetic fluxes generated at the first and second windings 16e1, 16e2 are opposite from each other so that the magnetism can be canceled out at the core.

It should also be noted that, although the secondary battery such as the lithium ion battery is exemplified as the battery 106, 202 in the second and third embodiments, a lead battery, nickel hydride battery or the like and also any electric storage device such as a capacitor can be applied instead.

INDUSTRIAL APPLICABILITY

According to this invention, in the DC-DC converter control apparatus, since it is configured to have the current detecting means for detecting a current flowing through a positive electrode wire connecting the common terminal with the positive electrode terminal of the high-voltage port and control means for controlling operations of the first and second switching elements based on the current detected by the current detecting means, it becomes possible to accurately detect the current of the windings and appropriately control the operation of the switching elements based on the detected currents without increasing the transformer in size.

DESCRIPTION OF SYMBOLS

10 Fuel cell vehicle, 16a Low-voltage port, 16a1 Positive electrode terminal (of the low-voltage port), 16a2 Negative electrode terminal (of the low-voltage port), 16b High-voltage port, 16b1 Positive electrode terminal (of the high-voltage port), 16b2 Negative electrode terminal (of the high-voltage port), 16e Transformer, 16e1 First winding, 16e2 Second winding, 16e1a, 16e2a One end (of the first and second windings), 16e1b, 16e2b Other end (of the first and second windings), 16f1 First IGBT (First switching element), 16f2 Second IGBT (Second switching element), 16h1 Positive electrode wire, 16i Negative electrode wire, 16k2 Second common terminal (Common terminal), 24 Current sensor (Current detecting means), 30 ECU (Electronic Control Unit), 100 Hybrid vehicle, 200 Electric vehicle.

The invention claimed is:

1. An apparatus for controlling a DC-DC converter having a magnetic-field canceling type transformer including first and second windings wound in reverse directions, each of the windings being connected to a positive electrode terminal of a low-voltage port at one end and connected to a positive electrode terminal of a high-voltage port through a common terminal at other end; a first switching element interposed between the other end of the first winding and a negative electrode wire connecting a negative electrode terminal of the low-voltage port with a negative electrode terminal of the high-voltage port; and a second switching element interposed between the other end of the second winding and the negative electrode wire, the apparatus comprising:

current detecting means for detecting a current flowing through a positive electrode wire connecting the common terminal with the positive electrode terminal of the high-voltage port, the current detecting means detecting a first current flowing through the positive electrode wire via the first winding at a first time point and a second current flowing through the positive electrode wire via the second winding at a second time point different from the first time point in accordance with ON and OFF states of the first and second switching elements; and control means for controlling operations of the first and second switching elements based on the first current and the second current detected by the current detecting means so that a current difference of the first and second windings becomes zero, wherein a duty ratio for controlling the first switching element and a duty ratio for controlling the second switching element by the control means are equal to each other, the current detecting means detect an excitation current flowing through the first winding due to mutual induction as the first current when the first switching element is turned OFF and the second switching element is turned ON by the control means, while the current detecting means detect an excitation current flowing through the second winding due to mutual induction as the second current when the first switching element is turned ON and the second switching element is turned OFF by the control means, and a time that the current detecting means takes to detect the excitation current flowing through the second winding from when the first switching element is turned ON is equal to a time that the current detecting means takes to detect the excitation current flowing through the first winding from when the second switching element is turned ON.

2. The apparatus according to claim 1, wherein the current detecting means comprises a current sensor capable of detecting a direct current component of the current flowing through the positive electrode wire.

3. The apparatus according to claim 1, wherein the control means calculates the current difference of the first and second windings based on the detected current and controls the operations of the first and second switching elements such that the calculated current difference becomes zero.

4. The apparatus according to claim 1, wherein the DC-DC converter is mounted on a fuel cell vehicle.

5. The apparatus according to claim 1, wherein the DC-DC converter is mounted on a hybrid vehicle.

6. The apparatus according to claim 1, wherein the DC-DC converter is mounted on an electric vehicle.

7. The apparatus according to claim 1, wherein the current detecting means is configured by a single current sensor provided at the positive electrode wire.

8. A method for controlling a DC-DC converter having a magnetic-field canceling type transformer including first and second windings wound in reverse directions, each of the windings being connected to a positive electrode terminal of a low-voltage port at one end and connected to a positive electrode terminal of a high-voltage port through a common terminal at other end; a first switching element interposed between the other end of the first winding and a negative electrode wire connecting a negative electrode terminal of the low-voltage port with a negative electrode terminal of the high-voltage port; and a second switching element interposed between the other end of the second winding and the negative electrode wire, wherein the method comprises the steps of:

detecting a current flowing through a positive electrode wire connecting the common terminal with the positive electrode terminal of the high-voltage port, the step of detecting comprising detecting a first current flowing through the positive electrode wire via the first winding at a first time point and a second current flowing through the positive electrode wire via the second winding at a second time point different from the first time point in accordance with ON and OFF states of the first and second switching elements; and controlling operations of the first and second switching elements based on the first current and the second current detected in the step of detecting so that a current difference of the first and second windings becomes zero, wherein a duty ratio for controlling the first switching element and a duty ratio for controlling the second switching element in the step of controlling are equal to each other, the step of detecting includes detecting an excitation current flowing through the first winding due to mutual induction as the first current when the first switching element is turned OFF and the second switching element is turned ON in the step of the controlling, while the step of detecting includes detecting an excitation current flowing through the second winding due to mutual induction as the second current when the first switching element is turned ON and the second switching element is turned OFF in the step of controlling, and a time that it takes to detect the excitation current flowing through the second winding in the step of detecting from when the first switching element is turned ON is equal to a time that it takes to detect the excitation current flowing through the first winding in the step of detecting from when the second switching element is turned ON.

9. The method according to claim 8, wherein the step of current detecting comprises detecting a direct current component of the current flowing through the positive electrode wire.

10. The method according to claim 8, wherein the step of controlling calculates the current difference of the first and second windings based on the detected current and controls the operations of the first and second switching elements such that the calculated current difference becomes zero.

11. The method according to claim 8, wherein the DC-DC converter is mounted on a fuel cell vehicle.

12. The method according to claim 8, wherein the DC-DC converter is mounted on a hybrid vehicle.

13. The method according to claim 8, wherein the DC-DC converter is mounted on an electric vehicle.

14. The method according to claim 8, wherein the step of detecting includes detecting the first and second currents flowing through the positive electrode wire by a single current sensor provided at the positive electrode wire.

* * * * *